US008695658B2

(12) United States Patent  (10) Patent No.: US 8,695,658 B2
Tagashira  (45) Date of Patent: Apr. 15, 2014

(54) PNEUMATIC TIRE

(75) Inventor: Masao Tagashira, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/450,915

(22) Filed: Apr. 19, 2012

(65) Prior Publication Data

US 2012/0267022 A1   Oct. 25, 2012

(30) Foreign Application Priority Data

Apr. 20, 2011 (JP) ................................. 2011-094327

(51) Int. Cl.
*B60C 11/117*  (2006.01)
*B60C 11/11*  (2006.01)

(52) U.S. Cl.
USPC ................................ 152/209.18; 152/209.25

(58) Field of Classification Search
USPC ............. 152/209.15, 209.18, 209.22, 209.25, 152/209.27
IPC ........................................... B60C 11/11,11/117
See application file for complete search history.

(56) References Cited

U.S. PATENT DOCUMENTS

2006/0108040 A1 * 5/2006 Miyazaki ................. 152/209.15

FOREIGN PATENT DOCUMENTS

| EP | 855291 A2 * | 7/1998 | ............. B60C 11/04 |
| JP | 05254311 A * | 10/1993 | ............. B60C 11/04 |
| JP | 9-193616 A | 7/1997 | |
| JP | 2008-120232 A | 5/2008 | |

OTHER PUBLICATIONS

Machine Translation: JP05-254311; Nakagawa, Masao; no date.*
Machine Translation: EP855291; Schmalz, Manfred; no date.*

* cited by examiner

*Primary Examiner* — Richard Crispino
*Assistant Examiner* — Kendra Shin
(74) *Attorney, Agent, or Firm* — Birch, Stewart, Kolasch & Birch, LLP

(57) ABSTRACT

A pneumatic tire comprises a tread portion provided on each side of the tire equator with a land zone defined between two circumferential main grooves, wherein the land zone is provided with axial grooves extending between the main grooves and inclining to a first circumferential direction at an angle of from 30 to 50 degrees with respect to the tire axial direction, and auxiliary grooves inclining to a second circumferential direction opposite to the first circumferential direction. The axial groove is shallow in its axially-inner-main-groove side in comparison with its axially-outer-main-groove side. The auxiliary groove is deep in its axially-inner-main-groove side in comparison with its axially-outer-main-groove side.

4 Claims, 6 Drawing Sheets

Prior Art

PNEUMATIC TIRE

BACKGROUND OF THE INVENTION

The present invention relates to a pneumatic tire, more particularly to a tread pattern capable of improving the drainage and snowy road performance without sacrificing the steering stability and uneven wear resistance.

A pneumatic tire (t) which is provided in the tread portion (a) with circumferential grooves (s) and axial grooves (g) to form a plurality of blocks (b) defining a block pattern has been widely employed. Further, as shown in FIG. 6, a technique to improve the drainage and snowy road performance such as traction of such pneumatic tire by additionally disposing auxiliary grooves (h) extending between the axial grooves (g) and inclined to the same direction as the axial grooves (g) has been widely employed. In this technique however, acute-angled corners (k) formed between the axial grooves (g) and auxiliary grooves (h) are liable to wear rapidly, and the tread pattern rigidity becomes relatively low in the acute-angled corners (k), which deteriorates the steering stability.

SUMMARY OF THE INVENTION

It is therefore, an object of the present invention to provide a pneumatic tire, in which the drainage and snowy road performance can be improved without sacrificing the steering stability and uneven wear resistance.

According to the present invention, a pneumatic tire comprises a tread portion provided on each side of the tire equator with a land zone defined between two circumferentially continuously extending axially inner and outer main grooves, wherein
the land zone is provided with
axial grooves which extend from the axially inner main groove to the axially outer main groove, while inclining to a first circumferential direction at an angle of from 30 to 50 degrees with respect to the tire axial direction, and auxiliary grooves each of which extends axially outwardly between the circumferentially adjacent axial grooves, while inclining to a second circumferential direction opposite to the first circumferential direction, and
the axial grooves each have a variable depth such that a depth measured in an axially-inner-main-groove side is less than a depth measured in an axially-outer-main-groove side, whereas the auxiliary grooves each have a variable depth such that a depth measured in an axially-inner-main-groove side is more than a depth measured in an axially-outer-main-groove side.

Further, the pneumatic tire according to the present invention may be provided with the following optional features:

the axial grooves each have a variable width such that a width measured in the above-mentioned axially-inner-main-groove side is less than a width measured in the above-mentioned shoulder-main-groove side;

the axial groove each comprise
a shallow groove part extending from the axially inner main groove toward the tread edge, and
a deep groove part extending from the shallow groove part, and the axially inner end of the auxiliary groove is connected to the shallow groove part at an axial distance of 65 to 85% of the axial length of the shallow groove part, from the edge of the axially inner main groove;

the auxiliary grooves each have an inclination angle with respect to the tire axial direction which gradually decreases toward the tread edge;

the axial distance from the axially inner main groove to the axially inner end of each of the auxiliary grooves which end is connected to one of the axial grooves is more than the axial distance Ly from the axially outer main groove to the axially outer end of the same auxiliary groove which end is connected to circumferentially adjacent another axial groove.

Therefore, the axial grooves can exert their edge effect during straight running and during cornering in a well balanced manner to improve the snowy road performance, steering stability and the like. The auxiliary grooves can increase the groove edges and volume while maintain the rigidity of the land zone in the corners between the auxiliary grooves and the axial grooves, therefore, the snowy road performance, drainage and the like can be improved without sacrificing the steering stability, uneven wear resistance and the like.

By the variable depth of the axial grooves and the variable depth of the auxiliary groove, the land zone is increased in the rigidity in its tire equator side and tread edge side, therefore, the steering stability, uneven wear resistance and the like can be improved.

As the axial grooves 8 and the auxiliary grooves 9 are inclined to the opposite directions, the rigidity of the middle block is prevented from decreasing, and the drainage, snowy road performance and the like can be improved without sacrificing the steering stability, uneven wear resistance and the like.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch (camber angle=0) in the normally inflated loaded condition.

The tread width TW is the axial distance between the tread edges Te measured in the normally inflated unloaded condition of the tire.

DESCRIPTION OF THE PREFERRED EMBODIMENTS

Figure 1:
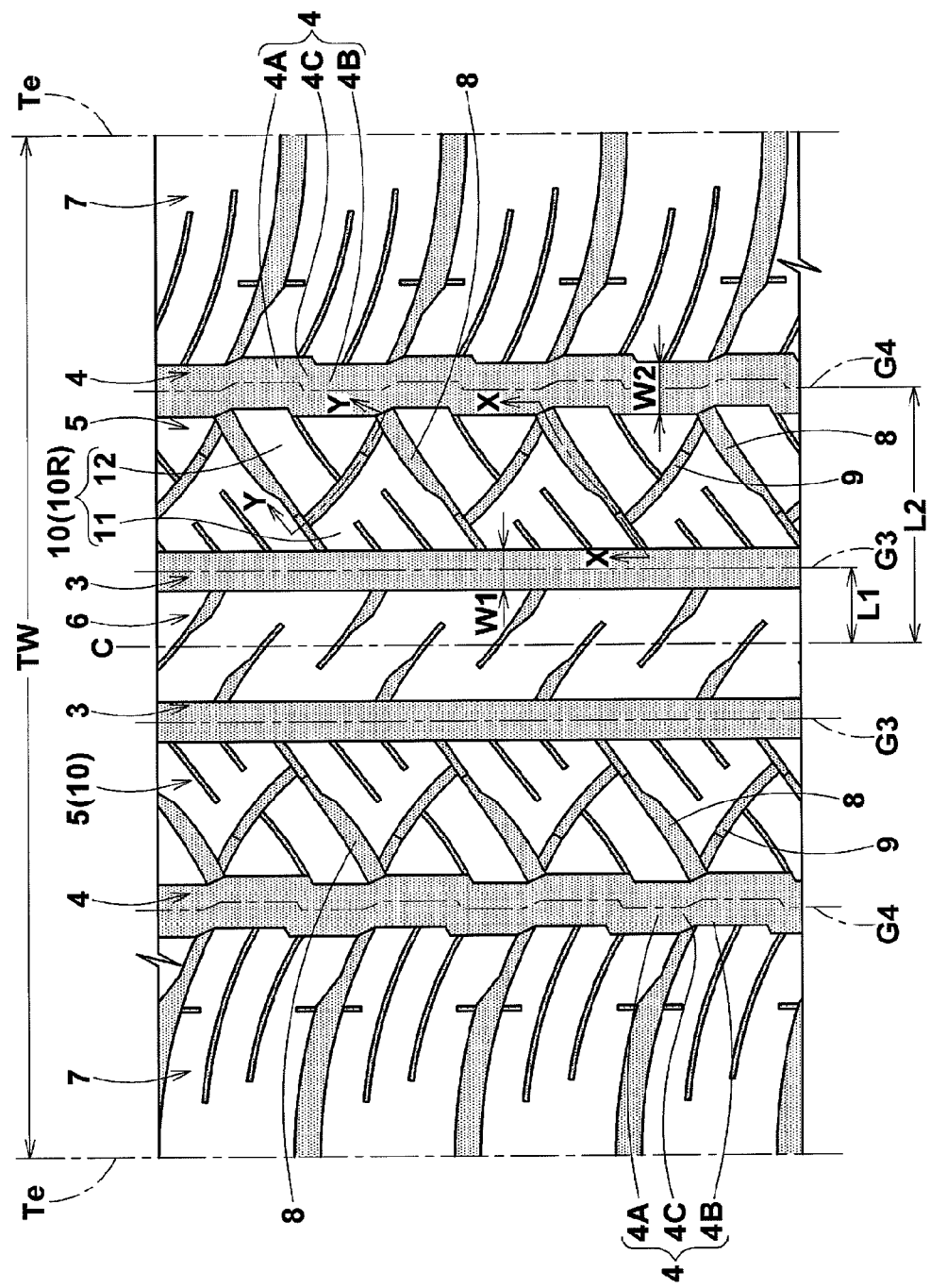
FIG. 1 is a developed partial view showing the tread portion of a pneumatic tire according to the present invention.

Embodiments of the present invention will now be described in detail in conjunction with the accompanying drawings.

The present invention can be suitably applied to passenger tires. In the drawings, a pneumatic tire according to the present invention is a radial tire for passenger cars such as SUV.

A unidirectional tread pattern may be provided for the pneumatic tire according to the present invention. But, in this embodiment, the pneumatic tire is provided with a bidirectional tread pattern which is substantially symmetry with respect to any point on the tire equator. Here, the expression "substantially" means that an asymmetrical arrangement of the tread elements due to so called pitch variation to reduce tread pattern noise may be included.

As shown in FIG. 1, the tread portion 2 of the pneumatic tire in this embodiment is provided on each side of the tire equator c with two circumferentially continuously extending main grooves (namely, axially inner main groove 3 and axially outer main groove 4) to thereby form a pair of shoulder land zones 7 between the main grooves 4 and tread edges Te, a pair of middle land zones 5 between the main grooves 3 and 4, and a center land zone 6 between the two main grooves 3 and 3.

Each of the middle land zones 5 is provided with axial grooves 8 arranged circumferentially of the tire at intervals and extending parallel with each other from the axially inner main groove 3 to the axially outer main groove to divide this middle land zone 5 into a circumferential row 10R of middle blocks 10.

Each of the middle blocks 10 is provided with a single auxiliary groove 9 connecting between the circumferentially adjacent axial grooves 8 to subdivide the block 10 into an inside part 11 on the tire equator side of the auxiliary groove 9 and an outside part 12 on the tread edge side of the auxiliary groove 9.

The main grooves 3 and 4 may be formed in various configurations such as straight configuration, zigzag configuration and smoothly curved wavy configuration. In this embodiment, however, the axially inner main groove 3 is configured as a straight groove whose edges are parallel with each other and each extend straight in the tire circumferential direction in order to enhance the drainage in the tread crown region and to prevent unstable motion of the vehicle during braking. The axially outer main groove 4 is configured as a zigzag groove made up of axially outside groove parts 4A extending parallel to the tire circumferential direction, axially inside groove parts 4B extending parallel to the tire circumferential direction, and transitional parts 4c extending obliquely between the parts 4A and 4B in order to increase the shearing force of snow packed into the groove during straight running while marinating a good snow self-ejecting ability and good drainage.

In order to ensure a good drainage while keeping sufficient rigidity of the land zones 5 and 6, the width W1 of the axially inner main groove 3 is preferably set in a range of from 2 to 6% of the tread width TW. The width W2 of the axially outer main groove 4 is preferably set in a range of from 3 to 7% of the tread width TW. The depth D1 of the axially inner main groove 3 and the depth D2 of the axially outer main groove 4 are preferably set in a range of from 7.5 to 10 mm in the case of passenger tires. In this application, the width of a groove means a width measured perpendicularly to the center line of the groove at the top of the groove.

Preferably, the axially inner main groove 3 is disposed at a position such that the widthwise center line G3 thereof is at an axial distance L1 of from 5 to 8% of the tread width TW from the tire equator c, and the axially outer main groove 4 is disposed at a position such that the widthwise center line G4 thereof is at an axial distance L2 of from 22 to 26% of the tread width TW from the tire equator C in order to optimize the rigidity among the center land zone 6, middle land zones 5 and shoulder land zones 7 and thereby further improve the steering stability.

Figure 2:
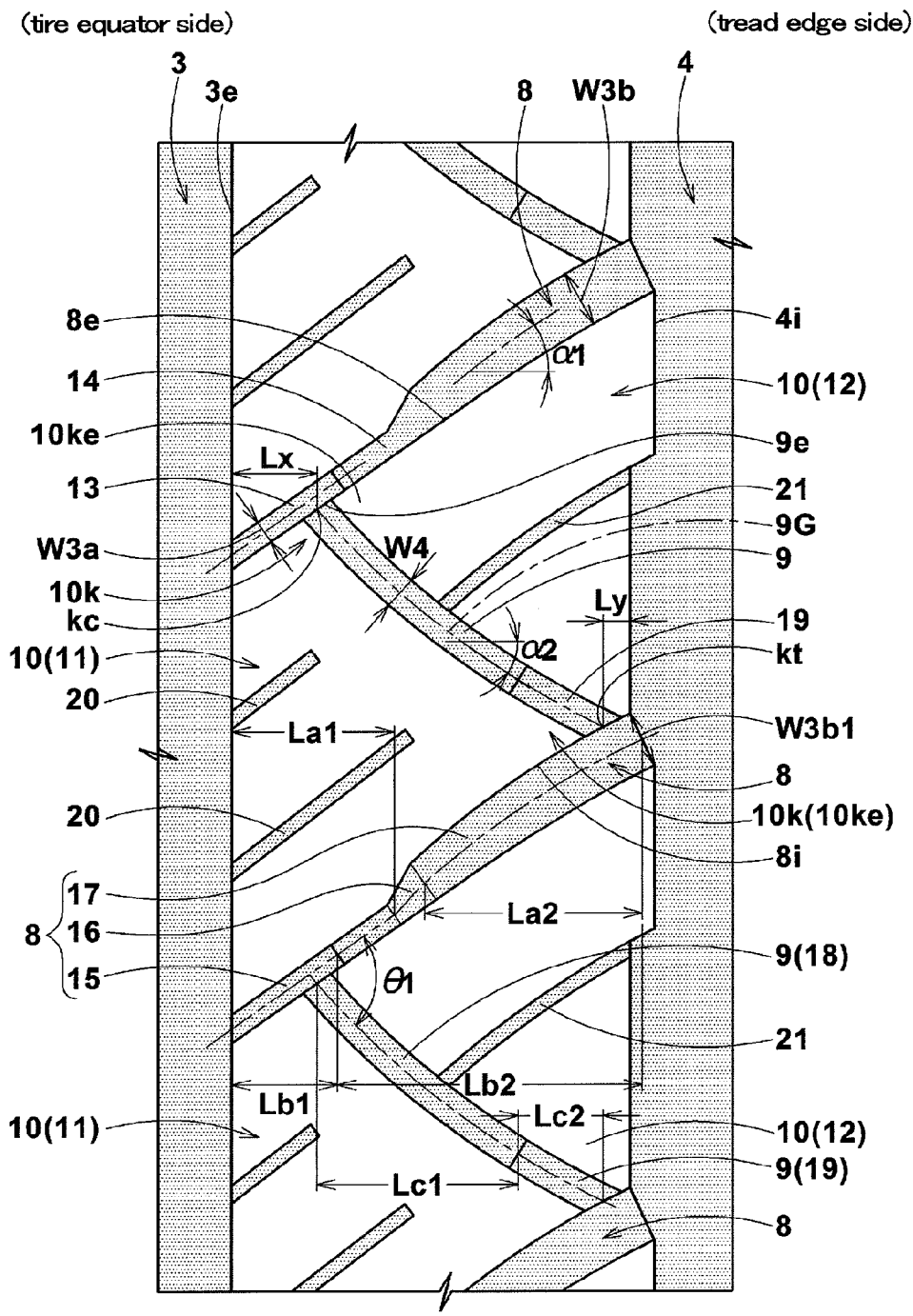
FIG. 2 is a partial top view of a middle land zone of the tread portion.

In each of the middle land zones 5, as shown in FIG. 2, the axial grooves 8 are inclined to a first circumferential direction from the axially inside to the axially outside at an angle α1 of not less than 30 degrees, preferably not less than 35 degrees, but not more than 50 degrees, preferably not more than 45 degrees with respect to the tire axial direction in order to obtain good traction during straight running and cornering in a well balanced manner and thereby to obtain good snow traction, steering stability and straight running stability. If the angle α1 is less than 30 degrees, the circumferential component of the groove edges decreases and the traction during cornering becomes insufficient. If the angle α1 is more than 50 degrees, the axial component of the groove edges decreases and the traction during straight running becomes insufficient.

Each of the axial grooves 8 has a variable depth D3 such that the depth D3a measured in a main groove 3 side (an axially inner part) is less than the depth D3b measured in a main groove 4 side (an axially outer part).

Figure 3A:
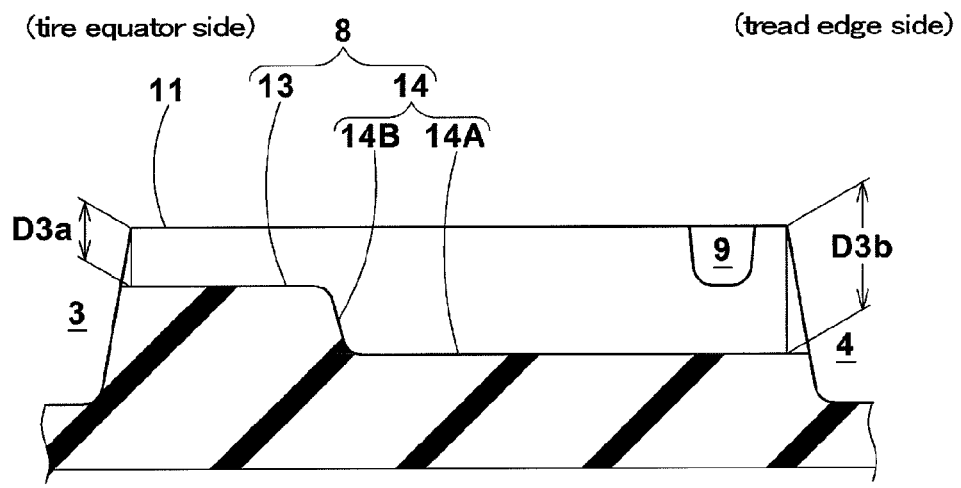
FIG. 3(a) is a cross sectional view taken along line X-X of FIG. 1.

In this embodiment, as shown in FIG. 3(a), a shallow part 13 having the above-mentioned depth D3a extends axially outwardly from its axially inner end positioned at the axially inner main groove 3, and a deep part 14A having the above-mentioned depth D3b extends axially inwardly from its axially outer end positioned at the axially outer main groove 4. And between the shallow part 13 and the deep part 14A, there is formed a varying part 14B in which the depth D3 is gradually varied between D3a and D3b.

Each of the depth D3a and depth D3b is substantially constant and may have a variation up to about 1 mm.

Therefore, the apparent rigidity of the middle block 10 is increased in its axially inner part subjected to a relatively large ground pressure during straight running to prevent uneven wear, and further, the drainage toward the axially outer main groove 4 is improved.

Preferably, the ratio D3a/D3b of the depth D3a to the depth D3b is set in a range of not less than 0.25, more preferably not less than 0.4, but not more than 0.8, more preferably not more than 0.6. If the ratio D3a/D3b becomes more than 0.8, the rigidity of the middle block 10 decreases in its axially inner part and there is a possibility that the straight running stability is deteriorated. If the ratio D3a/D3b becomes less than 0.25, the drainage becomes insufficient.

For the similar reasons, the ratio Lb1/Lb2 of the axial length Lb1 of the shallow groove part 13 to the axial length Lb2 of a deeper part 14 (=part 14A+part 14B) is preferably set in a range of not less than 0.15, more preferably not less than 0.2, but not more than 0.45, more preferably not more than 0.4.

Further, the axial groove 8 has a variable width W3 such that a width W3a measured in a main groove 3 side (an axially inner part) is less than a width W3b measured in a main groove 4 side (an axially outer part) in order to increase the drainage toward the axially outer main groove 4.

In order that the middle block 10 is provided with rigidity in its axially inner part subjected to large ground pressure during straight running, in this embodiment, as shown in FIG. 2, the axial groove 8 is made up of:

a constant width part 15 having the narrow width W3a and extending axially outwardly from the main groove 3;

a curved wide part 17 slightly curved in an arc shape and extending axially inwardly from the axially outer main groove 4 while gradually slightly decreasing the groove width; and a widening part 16 connecting between the two parts 15 and 17 while changing the groove width at a larger rate than in the curved part 17. In this example, further, the edges of the parts 15 and 16 and 17 on the second circumferential direction side extend in line, whereas the edges on the first circumferential direction side extend zigzag due to the widening part 16.

In order to achieve the rigidity in the axially inner part and the drainage in a well balanced manner, the minimum groove width W3a in the constant width part 15 is preferably set in a range of not less than 0.25 times, more preferably not less than 0.3 times, but not more than 0.55 times, more preferably not more than 0.5 times the maximum groove width W3b1 of the curved part 17 measured at the axially outer end at the main groove 4.

For the similar reasons, the ratio La1/La2 of the axial length La1 of the constant width part 15 to the axial length La1 of the curved part 17 is preferably set in a range of not less than 0.8, more preferably not less than 0.9, but not more than 1.3, more preferably not more than 1.2.

The auxiliary grooves 9 are inclined to a second circumferential direction opposite to the above-mentioned first circumferential direction from the axially inside to the axially outside. Preferably, the intersecting angle θ1 of the auxiliary groove 9 with the axial groove 8 is set to be not less than 65 degrees, more preferably not less than 75 degrees in order to prevent excessive decrease in the rigidity of the corners 10k especially acute-angled corners 10ke of the middle block 10 formed between the auxiliary groove 9 and the axial groove 8. Therefore, the auxiliary groove 9 can exert its edges to improve the snowy road performance, drainage and the like without sacrificing the uneven wear resistance, steering stability and the like.

The auxiliary groove 9 has a variable depth D4 such that a depth D4b measured in a main groove 4 side (an axially outer part) is less than a depth D4a measured in a main groove 3 side (an axially inner part) in order that an excessive decrease in the rigidity of the middle block 10 in its axially outer part can be prevented in cooperation with the above-mentioned arrangement of the depth of the axial groove 8.

Figure 3B:
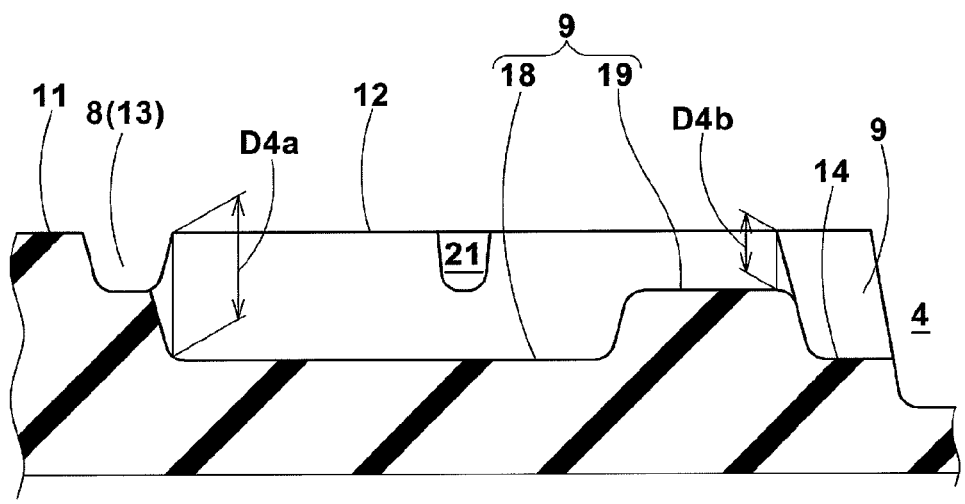
FIG. 3(b) is a cross sectional view taken along line Y-Y of FIG. 1.

In this embodiment, as show in FIG. 3 (b), the auxiliary groove 9 is made up of a deep groove segment 18 having the above-mentioned depth D4a and extending axially outwardly from its axially inner end 9e connected to the shallow groove part 13 of one of the axial grooves 8, and a shallow groove segment 19 having the above-mentioned depth D4b and extending axially outwardly from the deep groove segment 18 to its axially outer end connected to the deep groove part 14 of circumferentially adjacent another axial groove 8.

In order to increase the rigidity of the middle block 10 in its axially inner part, the position of the shallow groove part 13 at which the axially inner end 9e of the auxiliary groove 9 is connected is at an axial distance in a range of not less than 65%, preferably not less than 70% but not more than 85%, preferably not more than 80% of the above-mentioned axial length Lb1 of the shallow groove part 13 from the axially outer edge 3e of the axially inner main groove 3. If the axial distance is less than 65% of the axial length Lb1, there is a possibility that the rigidity of the inside part 11 of the middle block becomes insufficient. If the axial distance is more than 95%, the axial component of the groove edges of the auxiliary groove 9 is decreased and it becomes difficult to obtain a desired traction during straight running.

In this embodiment, the ratio D4b/D4a of the depth D4b of the shallow groove segment 19 at the axially outer end to the depth D4a of the deep groove segment 18 at the axially inner end 9e is preferably set in a range of not less than 0.25, more preferably not less than 0.4, but not more than 0.8, more preferably not more than 0.6. If the ratio D4b/D4a becomes more than 0.8, there is a possibility that the straight running stability is deteriorated. If the ratio D4b/D4a becomes less than 0.25, there is a possibility that the drainage is deteriorated.

In order to enhance the above explained advantageous effects, preferably, the ratio Lc1/Lc2 of the axial length Lc1 of the deep groove segment 18 to the axial length Lc2 of the shallow groove segment 19 is set in a range of not less than 1.5, more preferably not less than 1.7, but not more than 3.0, more preferably not more than 2.7.

As shown in FIG. 2, the auxiliary groove 9 is inclined at an angle α2 which gradually decreases from the axially inside to the axially outside within a range of from 30 to 60 degrees with respect to the tire axial direction so as to slightly curve in an arc shape in order to smoothen the drainage toward the axially outer main groove 4 during cornering without sacrificing the lateral stiffness (rigidity) of the outside part 12 of the middle block subjected to a large lateral force during cornering.

The width W4 of the auxiliary groove 9 is preferably set in a range of not less than 15%, more preferably not less than 20%, but not more than 35%, more preferably not more than 30% of the width W1 of the axially inner main groove 3 in view of the rigidity of the middle block 10, drainage and snowy road performance. In this embodiment, the width W4 of the auxiliary groove 9 is constant.

In order to prevent decrease in the rigidity of the axially inner part of the middle block 10 and thereby to secure the steering stability, uneven wear resistance and the like, it is preferable that the axial distance Lx from the axially outer edge 3e of the axially inner main groove 3 to the intersecting point Kc of the widthwise center line 9G of the auxiliary groove 9 with the axially outer edge 8e of the axial groove 8 is more than the axial distance Ly from the axially inner edge 4i of the axially outer main groove 4 to the intersecting point Kt of the widthwise center line 9G of the same auxiliary groove 9 with the axially inner edge 8i of the next axial groove 8.

In this case, the ratio Lx/Ly is preferably set in a range of not less than 1.8, more preferably not less than 2.3, but not more than 2.8, more preferably not more than 3.3. If the ratio Lx/Ly is less than 1.8, there is a possibility that the steering stability, uneven wear resistance and the like are deteriorated. If the ratio Lx/Ly is more than 2.8, there is a possibility that the snowy road performance is deteriorated.

The middle block 10 is provided in the above-mentioned inside part 11 with at least one middle rug groove 20 extending obliquely and axially outwardly from the axially inner main groove 3 and terminating within the inside part 11 in order to exert the edge effect without excessively decreasing the rigidity of the inside part 11. In this embodiment, two middle rug grooves 20 are provided for each of the inside parts 11 to exert the edge effect more. This can further improve the snowy road performance and steering stability in a well balanced manner.

On the other hand, the outside part 12 of the middle block 10 is provided with a single small oblique groove 21 extending obliquely from the axially outer main groove 4 to the auxiliary groove 9 so as to exert the edge effect to further improve the snowy road performance, steering stability and the like.

The middle rug groove(s) 20 and small oblique groove 21 are inclined to the same circumferential direction as the axial groove 8 from the axial inside to the axially outside at the substantially same angles as the axial grooves 8 with respect to the axial direction. In other words, the middle rug groove(s) 20 and small oblique groove 21 are parallel with the axial grooves 8. Thereby, the rigidity difference between the inside part 11 and outside part 12 of the middle block is decreased.

Figure 4:
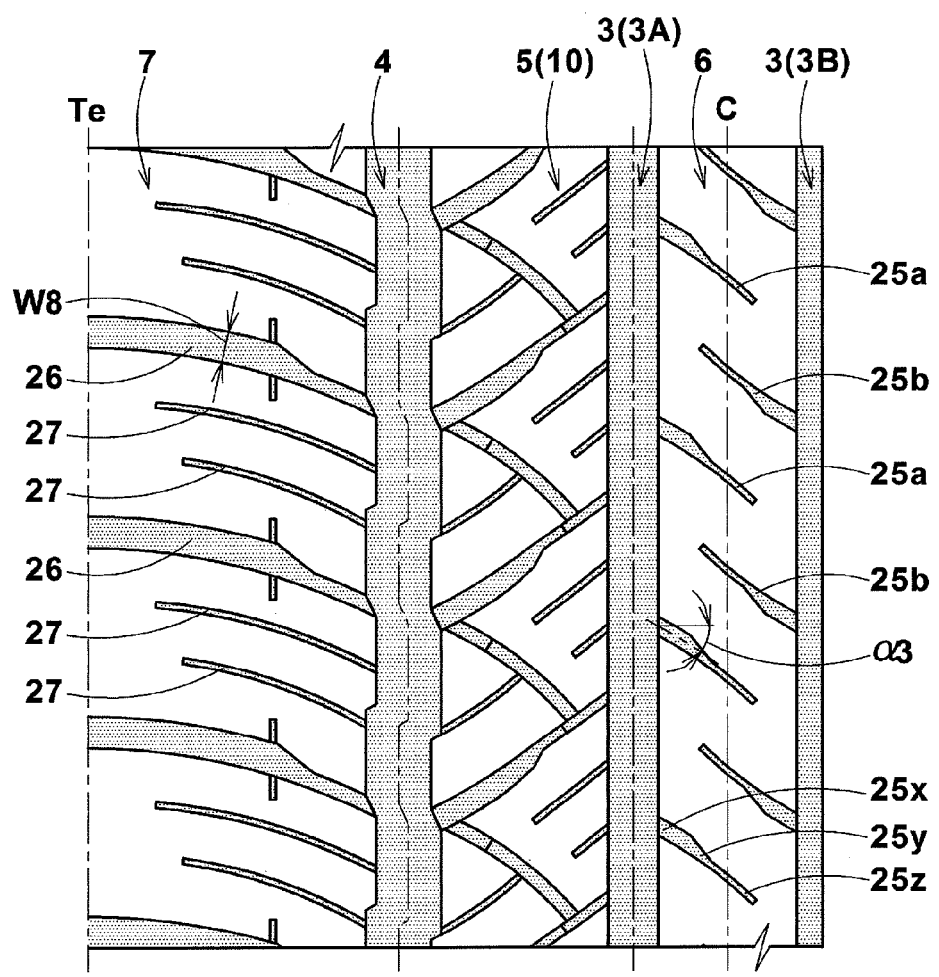
FIG. 4 is a closeup of a lift half of FIG. 1.
Figure 5:
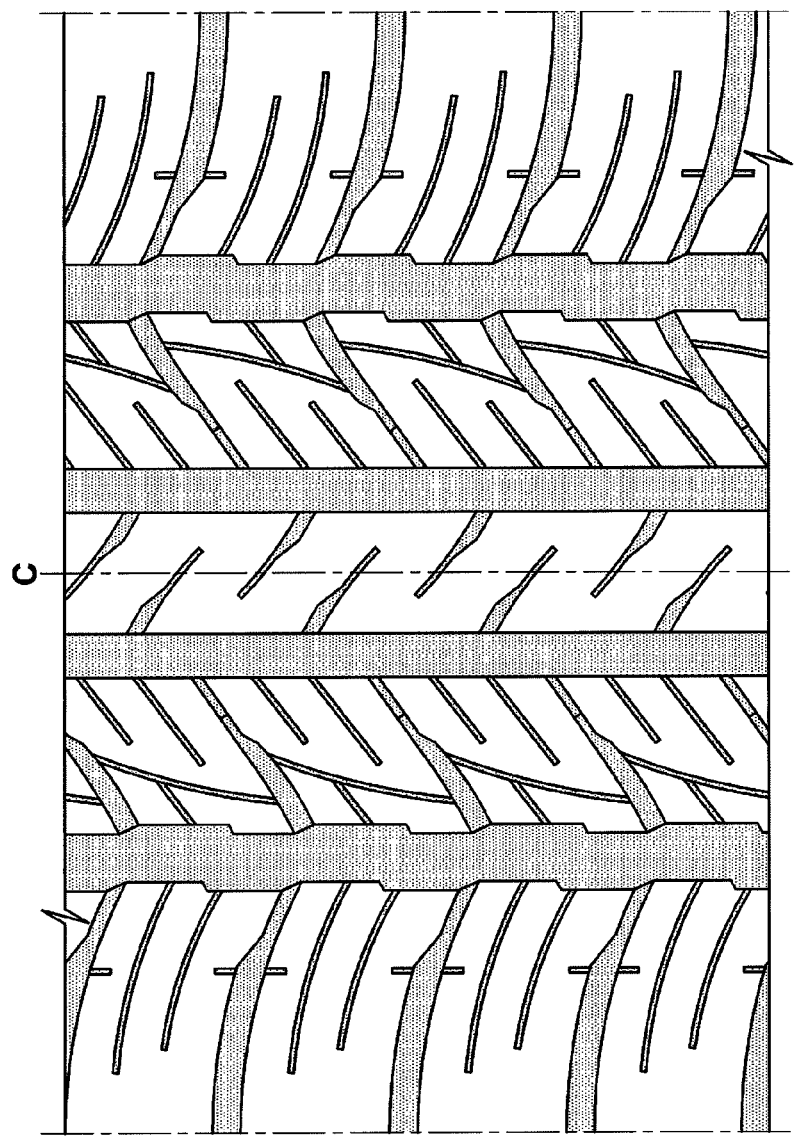
FIG. 5 is a developed partial view of the tread portion of a tire used in the undermentioned comparative tests as a comparative example.
Figure 6:
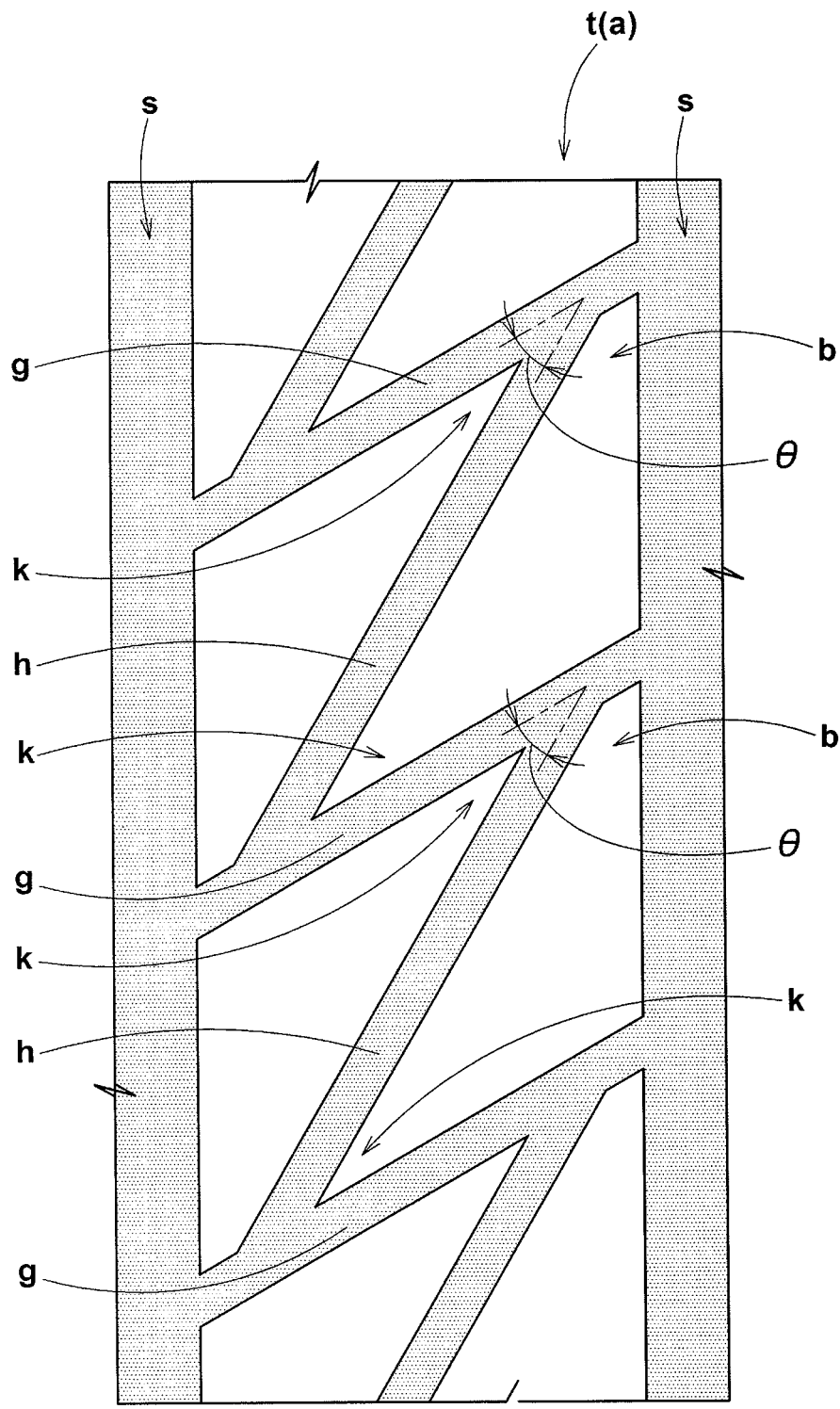
FIG. 6 is a plan view of a conventional block row.

The above-mentioned center land zone 6 is as shown in FIG. 4 provided with center rug grooves 25a and 25b in order to enhance the drainage in the center land zone 6 without sacrificing the rigidity of the center land zone 6 and exert the axial edge effect to improve the steering stability and snowy road performance. The center rug grooves 25a and 25b are arranged alternately in the tire circumferential direction and each extending from one of the axially inner main grooves 3 toward the other beyond the tire equator c and then terminating within the center land zone 6 without reaching to the other main groove 3. All of the center rug groove 25a and 25b are inclined in the same direction at an angle α3 of from 20 to 50 degrees with respect to the tire axial direction.

Each of the center rug grooves 25a and 25b is made up of a wide part 25x having a constant width and extending from the main groove 3, a narrow part 25z having a narrower constant width and crossing the tire equator, and a narrowing part 25y therebetween whose width is varied from the wide part 25x to the narrow part 25z. In this example, similarly to the axial groove 8, one of the edges of the center rug groove is zigzag but the other is smooth, and the opposed edges of the adjacent two center rug grooves have the same configuration namely, zigzag or smooth, in order that the width of the portion therebetween becomes uniform.

The above-mentioned shoulder land zones 7 are each provided with shoulder axial groove 26 extending axially outwardly from the axially outer main groove 4 to the tread edge Te, and shoulder rug grooves 27 extending axially outwardly from the axially outer main groove 4 and terminating within the shoulder land zone 7 without reaching to the tread edge Te. The shoulder axial groove 26 and shoulder rug grooves 27 are arranged alternately in the tire circumferential direction such that two rug grooves 27 are disposed between every two adjacent shoulder axial grooves 26 in this embodiment.

The maximum groove width W8 of the shoulder axial groove 26 is set in a range of from 40 to 60% of the groove width W2 of the axially outer main groove 4.

In each of the shoulder land zones 7, the shoulder axial grooves 26 and the shoulder rug groove 27 are inclined to one circumferentially direction from the axially inside to the axially outside not to decrease the rigidity of the shoulder land zone 7.

Further, in this example, similarly to the axial groove 8, one of the edges of the shoulder axial groove 26 is zigzag but the other is smooth Preferably, the shoulder axial grooves 26 are aligned with the auxiliary grooves 9 through the main groove 4 in order to enhance the drainage from the middle land zone 5 toward the tread edge.

Comparison Tests

Pneumatic tire of size 245/55R19 (rim size 19×7J) having specifications shown in Table 1 where prepared and tested. Common specifications are as follows:
tread width TW: 200 mm
<Axially Inner Main Groove>
  width W1: 3.5% of TW
  depth D1: 8.5 mm
  position L1: 6.5% of TW
<Axially Outer Main Groove>
  width W2: 4.1% of TW
  depth D2: 8.5 mm
  position L2: 24 to 25% of TW
<Axial Groove>
  width W3a: 2.0 to 2.5 mm
  depth D3a: 3 mm
<Auxiliary Groove>
  width W4: 2% of Tw
  depth D4a: 6 mm
<Middle Rug Groove>
  depth: 6 mm
<Small Oblique Groove>
  depth: 6 mm
<Center Rug Groove>
  depth: 6 mm
<Shoulder Axial Groove>
  depth: 6 mm
<Shoulder Rug Groove>
  depth: 7.5 mm
<Snowy Road Performance Test>

The test tires (Tire pressure 210 kPa) were attached to all of the four wheels of a 2400 cc four-wheel-drive car (SUV) and run on a snowy road. The test driver evaluated the snowy road performance based on traction during starting, accelerating and braking. The results are indicated in Table 1 by the use of an index based on Embodiment Tire Ex. 1 being 100, wherein the larger value, the better the performance.

<Drainage Test (Lateral Aquaplaning Test)>

The above-mentioned test car was run along a 100 meter radius circle on a wet asphalt road provided with a 10 mm depth 20 m long water pool, and the lateral acceleration (lateral G) during running in the water pool was measured at the front wheels, gradually increasing the speed entering into the water pool, to obtain the average for the speed range of from 55 to 80 km/h. The results are indicated in Table 1 by an index based on Embodiment tire Ex. 1 being 100, wherein the higher the index number the better the performance.

<Steering Stability Test> the above-mentioned test car was run on a dry asphalt road in a tire test course and the test driver evaluated the steering stability base on steering response, rigid feeling, traction, cornering stability, straight running stability and the like. The results are indicated in Table 1 by the use of an index based on Embodiment tire Ex. 1 being 100, wherein the larger value, the better the performance.

<Uneven Wear Resistance Test>

After the test car was run on the drying asphalt road for 10,000 Km, the difference in the amount of wear between the axially inner and outer edges of the axially outer main groove was measured at five circumferential positions to obtain their average value. The results are indicated in Table 1 by the use of an index based on Embodiment tire Ex. 1 being 100, wherein the larger value, the better the performance.

TABLE 1

| Tire | Ref. 1 | Ex. 1 | Ref. 2 | Ex. 2 | Ex. 3 | Ref. 3 | Ex. 4 | Ex. 5 |
|---|---|---|---|---|---|---|---|---|
| tread pattern (FIG. No.) | 5 | 1 | 1 | 1 | 1 | 1 | 1 | 1 |
| axial groove angle α1 (deg.) | 40 | 40 | 25 | 30 | 50 | 55 | 40 | 40 |
| axial groove depth ratio D3a/D3b | 0.5 | 0.5 | 0.5 | 0.5 | 0.5 | 0.5 | 0.2 | 0.25 |
| auxiliary groove depth ratio D4b/D4a | 0.5 | 0.5 | 0.5 | 0.5 | 0.5 | 0.5 | 0.5 | 0.5 |
| axial groove width ratio W3a/W3b1 | 0.4 | 0.4 | 0.4 | 0.4 | 0.4 | 0.4 | 0.4 | 0.4 |
| auxiliary groove angle α2 (deg.) | 45 | 45 | 45 | 45 | 45 | 45 | 45 | 45 |
| snowy road performance | 100 | 100 | 105 | 101 | 99 | 92 | 97 | 99 |
| drainage | 101 | 100 | 90 | 99 | 101 | 104 | 96 | 99 |
| steering stability | 80 | 100 | 93 | 100 | 99 | 92 | 102 | 102 |
| uneven wear resistance | 80 | 100 | 102 | 100 | 100 | 95 | 100 | 100 |

| Tire | Ex. 6 | Ex. 7 | Ex. 8 | Ref. 4 | Ex. 9 | Ex. 10 | Ex. 11 | Ref. 5 |
|---|---|---|---|---|---|---|---|---|
| tread pattern (FIG. No.) | 1 | 1 | 1 | 1 | 1 | 1 | 1 | 1 |
| axial groove angle α1 (deg.) | 40 | 40 | 40 | 40 | 40 | 40 | 40 | 40 |
| axial groove depth ratio D3a/D3b | 0.4 | 0.6 | 0.8 | 1.0 | 0.5 | 0.5 | 0.5 | 0.5 |
| auxiliary groove depth ratio D4b/D4a | 0.5 | 0.5 | 0.5 | 0.5 | 0.2 | 0.25 | 0.8 | 1.0 |
| axial groove width ratio W3a/W3b1 | 0.4 | 0.4 | 0.4 | 0.4 | 0.4 | 0.4 | 0.4 | 0.4 |
| auxiliary groove angle α2 (deg.) | 45 | 45 | 45 | 45 | 45 | 45 | 45 | 45 |
| snowy road performance | 100 | 100 | 101 | 103 | 97 | 99 | 101 | 103 |
| drainage | 100 | 100 | 101 | 102 | 96 | 99 | 101 | 102 |
| steering stability | 100 | 100 | 99 | 90 | 102 | 102 | 99 | 90 |
| uneven wear resistance | 100 | 100 | 99 | 95 | 100 | 99 | 99 | 95 |

| Tire | Ex. 12 | Ex. 13 | Ex. 14 | Ex. 15 | Ex. 16 | Ex. 17 | Ex. 18 | Ex. 19 |
|---|---|---|---|---|---|---|---|---|
| tread pattern (FIG. No.) | 1 | 1 | 1 | 1 | 1 | 1 | 1 | 1 |
| axial groove angle α1 (deg.) | 40 | 40 | 40 | 40 | 40 | 40 | 40 | 40 |
| axial groove depth ratio D3a/D3b | 0.5 | 0.5 | 0.5 | 0.5 | 0.5 | 0.5 | 0.5 | 0.5 |
| auxiliary groove depth ratio D4b/D4a | 0.5 | 0.5 | 0.5 | 0.5 | 0.5 | 0.5 | 0.5 | 0.5 |
| axial groove width ratio W3a/W3b1 | 0.2 | 0.25 | 0.55 | 0.6 | 0.4 | 0.4 | 0.4 | 0.4 |
| auxiliary groove angle α2 (deg.) | 45 | 45 | 45 | 45 | 25 | 30 | 60 | 65 |
| snowy road performance | 97 | 99 | 101 | 102 | 101 | 100 | 99 | 97 |
| drainage | 96 | 99 | 101 | 102 | 95 | 99 | 101 | 103 |
| steering stability | 101 | 101 | 99 | 95 | 101 | 100 | 100 | 98 |
| uneven wear resistance | 100 | 100 | 99 | 97 | 101 | 101 | 99 | 97 |

The invention claimed is:

1. A pneumatic tire comprising
a tread portion provided on each side of the tire equator with a land zone defined between two circumferentially continuously extending axially inner and outer main grooves, wherein
said land zone is provided with
axial grooves which extend from the axially inner main groove to the axially outer main groove, while inclining to a first circumferential direction at an angle of from 30 to 50 degrees with respect to the tire axial direction, and
auxiliary grooves each of which extends axially outwardly between the circumferentially adjacent axial grooves, while inclining to a second circumferential direction opposite to the first circumferential direction, wherein
each of the axial grooves comprises a shallow groove part extending from the axially inner main groove toward the adjacent tread edge and a deep groove part extending from the shallow groove part, and
the axially inner end of each of the auxiliary grooves is connected to the shallow groove part at an axial distance of 65 to 85% of the axial length of the shallow groove part, from the edge of the axially inner main groove, and
the axial grooves each have a variable depth such that a depth measured in an axially-inner-main-groove side is less than a depth measured in an axially-outer-main-groove side, whereas the auxiliary grooves each have a variable depth such that a depth measured in an axially-inner-main-groove side is more than a depth measured in an axially-outer-main-groove side.

2. The pneumatic tire according to claim 1, wherein the axial grooves each have a variable width such that a width measured in said axially-inner-main-groove side is less than a width measured in said axially-outer-main-groove side.

3. The pneumatic tire according to claim 1, wherein the auxiliary grooves each have an inclination angle with respect to the tire axial direction which gradually decreases toward said adjacent tread edge.

4. The pneumatic tire according to claim 1, wherein the axial distance from the axially inner main groove to the axially inner end of each of the auxiliary grooves which end is connected to one of the axial grooves is more than the axial distance from the axially outer main groove to the axially outer end of the same auxiliary groove which end is connected to circumferentially adjacent another axial groove.

* * * * *